(12) United States Patent
Kwon et al.

(10) Patent No.: US 11,350,039 B2
(45) Date of Patent: May 31, 2022

(54) CONTRAST AND ENTROPY BASED PERCEPTION ADAPTATION USING PROBABILISTIC SIGNAL TEMPORAL LOGIC BASED OPTIMIZATION

(71) Applicant: HRL Laboratories, LLC, Malibu, CA (US)

(72) Inventors: Hyukseong Kwon, Thousand Oaks, CA (US); Amir M. Rahimi, Santa Monica, CA (US); Amit Agarwal, Monterey Park, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/133,345

(22) Filed: Dec. 23, 2020

(65) Prior Publication Data

US 2021/0227117 A1 Jul. 22, 2021

Related U.S. Application Data

(63) Continuation-in-part of application No. 17/030,354, filed on Sep. 23, 2020.
(Continued)

(51) Int. Cl.
*H04N 5/235* (2006.01)
*G06V 10/30* (2022.01)
(Continued)

(52) U.S. Cl.
CPC .......... *H04N 5/2352* (2013.01); *G06V 10/30* (2022.01); *G06V 20/13* (2022.01); *G06V 20/56* (2022.01)

(58) Field of Classification Search
CPC .......... G06K 9/00624; G06K 9/00791; G06K 9/0063; G06K 9/03; G06K 9/40;
(Continued)

(56) References Cited

U.S. PATENT DOCUMENTS 9,626,591 B2    4/2017  Holz et al.
2016/0165193 A1*  6/2016  Rasheed ............... H04N 7/188
                                              348/143
(Continued)

OTHER PUBLICATIONS

A. Dokhanchi, H.B. Amor, J.V. Deshmukh, and G. Fainekos, "Evaluating perception systems for autonomous vehicles using quality temporal logic," International Conference on Runtime Verification, pp. 409-416, 2018.
(Continued)

*Primary Examiner* — Peet Dhillon
(74) *Attorney, Agent, or Firm* — Tope-McKay & Associates

(57) ABSTRACT

Described is a system for contrast and entropy-based perception adaption to optimize perception. The system is operable for receiving an input image of a scene with a camera system and detecting one or more objects (having perception data) in the input image. The perception data of the one or more objects is converted into probes, which are then converted into axioms using probabilistic signal temporal logic. The axioms are evaluated based on probe bounds. If the axioms are within the probe bounds, then results are provided; however, if the axioms are outside of the probe bounds, the system estimates optimal contrast bounds and entropy bounds as perception parameters. The contrast and entropy in the camera system are then adjusted based on the perception parameters.

12 Claims, 7 Drawing Sheets

Related U.S. Application Data

(60) Provisional application No. 62/984,713, filed on Mar. 3, 2020, provisional application No. 62/905,059, filed on Sep. 24, 2019.

(51) Int. Cl.
*G06V 20/13* (2022.01)
*G06V 20/56* (2022.01)

(58) Field of Classification Search
CPC ...... G06K 9/52; G06K 9/2054; G06K 9/6265; H04N 5/232; H04N 5/2352; H04N 5/23218
See application file for complete search history.

(56) References Cited

U.S. PATENT DOCUMENTS

| | | | | |
|---|---|---|---|---|
| 2017/0364831 | A1* | 12/2017 | Ghosh | G06N 7/005 |
| 2019/0302439 | A1* | 10/2019 | Lyuboshenko | H04N 5/2354 |
| 2020/0036743 | A1* | 1/2020 | Almukaynizi | G06N 3/0445 |
| 2020/0111005 | A1* | 4/2020 | Ghosh | G06N 3/0454 |
| 2020/0111012 | A1* | 4/2020 | Wan | G06N 5/022 |
| 2020/0221009 | A1* | 7/2020 | Citerin | H04N 5/23222 |
| 2021/0089837 | A1 | 3/2021 | Kwon et al. | |

OTHER PUBLICATIONS

R.R. da Silva, V. Kurtz, and M. Hebert, "Active Perception and Control from Temporal Logic Specifications," arXiv:1905.03662, pp. 1-6, 2019.

S. Jha, V. Raman, D. Sadigh, and S.A. Seshia, "Safe Autonomy Under Perception Uncertainty Using Chance-Constrained Temporal Logic," Journal of Automated Reasoning, pp. 43-62, 2018.

D. Sadigh and A. Kapoor, "Safe control under uncertainty with Probabilistic Signal Temporal Logic," in Proc. of Robotics: Science and Systems, pp. 1-10, 016.

J. A. Stark, "Adaptive Image Contrast Enhancement Using Generalizations of Histogram Equalization," IEEE Transactions on Image Processing, vol. 9, No. 5, pp. 889-896, 2000.

V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, pp. 1-6, Jul. 2012.

YOLO Real Time Object Detection, located at pjreddie.com/darknet/yolo/, pp. 1-7, taken on Aug. 12, 2020.

Luminance Contrast, found at colorusage.arc.nasa.gov/luminance_cont.php, pp. 1-7, taken on Dec. 2, 2020.

Multiple Object Tracking Benchmark, located at motchallenge.net, pp. 1-3, taken on Aug. 12, 2020.

Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10.1007/s10278-007-9044-5.

A. Dokhanchi, H.B. Amor, J.V. Deshmukh, and G. Fainekos, "Evaluating perception systems for autonomous vehicles using quality temporal logic," International Conference on Runtime Verification, 2018, pp. 1-7, (Feb. 28, 2022).

R.R. da Silva, V. Kurtz, and M. Hebert, "Active Perception and Control from Temporal Logic Specifications," arXiv:1905.03662, 2019, pp. 1-6, (Feb. 28, 2022).

S. Jha, V. Raman, D. Sadigh, and S.A. Seshia, "Safe Autonomy Under Perception Uncertainty Using Chance-Constrained Temporal Logic," Journal of Automated Reasoning, 2018, pp. 43-62, (Feb. 28, 2022).

D. Sadigh and A. Kapoor, "Safe control under uncertainty with Probabilistic Signal Temporal Logic," in Proc. of Robotics: Science and Systems, 2016, pp. 1-10, (Feb. 28, 2022).

Joseph Redmon, Santosh Divvala, Ross Girshick, Ali Farhadi; The IEEE Conference on Computer Vision and Pattern Recognition (CVPR), 2016, pp. 779-788, (Feb. 28, 2022).

N. Wojke, A. Bewley and D. Paulus, "Simple online and realtime tracking with a deep association metric," 2017 IEEE International Conference on Image Processing (ICIP), Beijing, 2017, pp. 3645-3649, (Feb. 28, 2022).

YOLO: Real-Time Object Detection, https://pjreddie.com/darknet/yolo/, downloaded Dec. 15, 2020, (Feb. 28, 2022).

Notification of Transmittal and the International Search Report, and the Written Opinion of the International Searching Authority for PCT/US2020/052342; dated Feb. 2, 2021, (Feb. 28, 2022).

Balakrishnan Anand, et al., "Specifying and Evaluating Quality Metrics for Vision-based Perception Systems", 2019 Design, Automation & Test in Europe Conference & Exhibition (Date), EDAA, Mar. 25, 2019 (Mar. 25, 2019), pp. 1433-1438, XP033550188, (Feb. 28, 2022).

Tuncali Cumhur Erkan, et al., "Simulation-based Adversarial Test Generation for Autonomous Vehicles with Machine Learning Components", 2018 IEEE Intelligent Vehicles Symposium (IV), IEEE, Jun. 26, 2018 (Jun. 26, 2018), pp. 1555-1562, XP033423320, (Feb. 28, 2022).

The International Search Report and the Written Opinion of the International Searching Authority for PCT/US2020/066972; dated Apr. 16, 2021, (Feb. 28, 2022).

Wu, Y., et al., "Active Control of Camera Parameters for Object Detection Algorithms," ariv.org, Cornell University Library, NY, 2017, pp. 1-7, (Feb. 28, 2022).

Anand, B., et al., "Specifying and Evaluating Quality Mertics for Vision-based Perception Systems," 2019 Design, Automation & Test in Europe Conference & Exhibition, EDAA, pp. 1433-1438, (Feb. 28, 2022).

Erkan, T.C., et al., "Simulation-based Adversarial Test Generation for Autonomous Vehicles with Machine Learning Components," 2018 IEEE Intelligent Vehicles Symposium, pp. 1555-1562, (Feb. 28, 2022).

* cited by examiner

CONTRAST AND ENTROPY BASED PERCEPTION ADAPTATION USING PROBABILISTIC SIGNAL TEMPORAL LOGIC BASED OPTIMIZATION

CROSS-REFERENCE TO RELATED APPLICATIONS

This is a Continuation-in-Part application of U.S. Ser. No. 17/030,354, filed on Sep. 23, 2020, which is a non-provisional patent application of U.S. Provisional Application Ser. No. 62/905,059, filed on Sep. 24, 2019 AND U.S. Provisional Application Ser. No. 62/984,713, filed on Mar. 3, 2020, the entirety of which are hereby incorporated by reference.

The present application ALSO claims the benefit of and is a non-provisional patent application of U.S. Provisional Application No. 62/984,713, filed on Mar. 3, 2020, the entirety of which is hereby incorporated by reference.

BACKGROUND OF INVENTION

(1) Field of Invention

The present invention relates to a perception system and, more specifically, to a system that evaluates and corrects perception errors to optimize perception results through contrast and entropy-based perception adaptation using probabilistic signal temporal logic-based optimization.

(2) Description of Related Art

Perception systems are commonly used for object recognition and tracking, but often suffer from perception errors. Many researchers have attempted to address this issue; however, perception errors are still challenging issues despite performance improvements in perception systems in the last decade. In autonomous driving or navigation systems, a great number of wrong detections and recognitions threaten the safe and robust performance of fully autonomous systems. In order to describe perception errors and recover from them, there have been a number of research directions, especially with formally verifying the systems using temporal logic (see the List of Incorporated Literature References, Literature Reference Nos. 1 through 4).

Most existing systems plan to control the autonomous systems themselves rather than fix the perception systems. One prior art uses feedback in the system, and utilizes image contrast enhancement to provide better saliency to objects in the scene (see Literature Reference No. 5). Accordingly, it helps to detect objects in a more robust way (see Literature Reference Nos. 6 and 7). However, the corresponding conventional methods use the image contrast information of the entire image. So, if there are some non-object areas which cause high contrast, the contrast adaptation cannot improve object detection.

Thus, a continuing need exists for an improvement to perception systems using feedback control of a contrast parameter from detected objects within a formally verified system, as well as the ability to adjust entropy to acquire more appropriate saliency.

SUMMARY OF INVENTION

The present disclosure provides a system for contrast and entropy-based perception adaption to optimize perception. In one aspect, the system includes one or more processors and a memory. The memory is a non-transitory computer-readable medium having executable instructions encoded thereon, such that upon execution of the instructions, the one or more processors perform several operations. The system is operable for receiving an input image of a scene with a perception module (i.e., camera system) and detecting one or more objects (having perception data) in the input image. The perception data of the one or more objects is converted into probes, which are then converted into axioms using probabilistic signal temporal logic. The axioms are evaluated based on probe bounds. If the axioms are within the probe bounds, then results are provided without modification; however, if the axioms are outside of the probe bounds, the system estimates optimal contrast bounds and entropy bounds as perception parameters (i.e., camera system parameters). The contrast and entropy in the camera system are then adjusted based on the perception parameters.

In yet another aspect, in adjusting entropy, image kernels are applied such that if a change in entropy is positive, a sharpening filter is applied to increase entropy, and if a change in entropy is negative, a smoothing filter is applied to decrease entropy.

Further, adjusting contrast includes acquiring a desirable contrast deviation, such that once a desirable contrast deviation is acquired, histogram ranges are set to achieve contrast changes using a peak-to-peak contrast.

In another aspect, the camera system is incorporated into an adaptive sensor system of an autonomous vehicle or an unmanned aircraft system.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
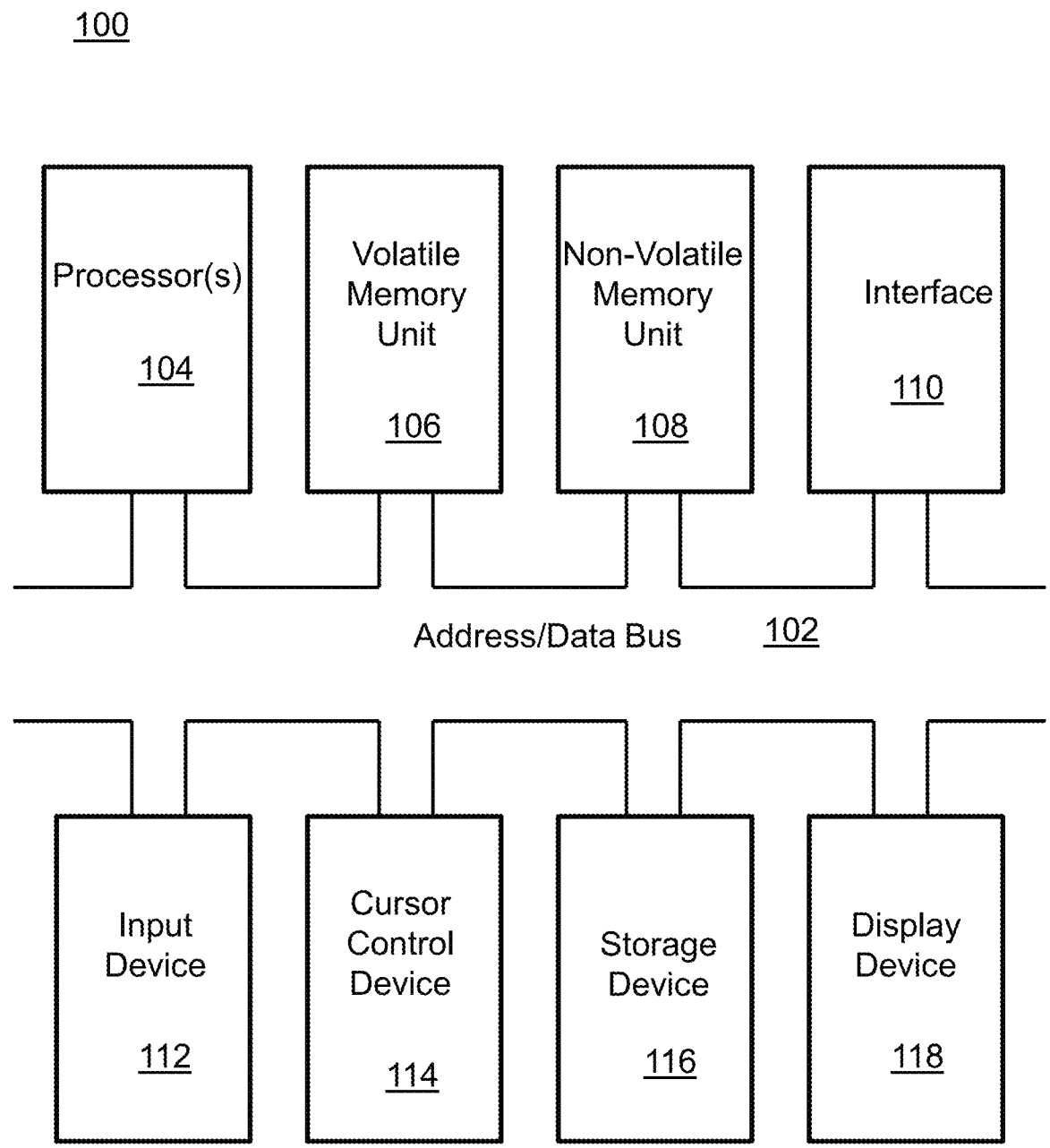
FIG. 1 is a block diagram depicting the components of a system according to various embodiments of the present invention.

The present invention relates to a perception system and, more specifically, to a system that evaluates and corrects perception errors to optimize perception results through contrast and entropy-based perception adaptation using probabilistic signal temporal logic-based optimization. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. A. Dokhanchi, H. B. Amor, J. V. Deshmukh, and G. Fainekos, "Evaluating perception systems for autonomous vehicles using quality temporal logic," International Conference on Runtime Verification, 2018.
2. R. R. da Silva, V. Kurtz, and M. Hebert, "Active Perception and Control from Temporal Logic Specifications," arXiv:1905.03662, 2019.
3. S. Jha, V. Raman, D. Sadigh, and S. A. Seshia, "Safe Autonomy Under Perception Uncertainty Using Chance-Constrained Temporal Logic," Journal of Automated Reasoning, 2018.
4. D. Sadigh and A. Kapoor, "Safe control under uncertainty with Probabilistic Signal Temporal Logic," in Proc. Of Robotics: Science and Systems, 2016.
5. J. A. Stark, "Adaptive Image Contrast Enhancement Using Generalizations of Histogram Equalization," IEEE Transactions on Image Processing, Vol. 9, No. 5, pp. 889-896, 2000.
6. U.S. Pat. No. 9,626,591, entitled, "Enhanced Contrast for Object Detection and Characterization by Optical Imaging," by D. Holz and H. Yang.
7. V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, July 2012.
8. U.S. application Ser. No. 17/030,354, filed on Sep. 23, 2020, entitled, "System and Method of Perception Error Evaluation and Correction by Solving Optimization Problems under the Probabilistic Signal Temporal Logic Based Constraints,"
9. YOLO Real Time Object Detection, located at pjreddie.com/darknet/yolo/, taken on Aug. 12, 2020.
10. Luminance Contrast, found at colorusage.arc.nasa.gov/luminance_cont.php, taken on Dec. 2, 2020.
11. Multiple Object Tracking Benchmark, located at motchallenge.net, taken on Aug. 12, 2020.
12. Information Entropy Measure for Evaluation of Image Quality, Du-Yih Tsai, Yongbum Lee, Eri Matsuyama, J Digit Imaging. 2008 September; 21(3): 338-347. Published online 2007 Jun. 19. doi: 10.1007/s10278-007-9044-5.

(2) PRINCIPAL ASPECTS

Various embodiments of the invention include three "principal" aspects. The first is a system for contrast and entropy-based perception adaption to optimize perception. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
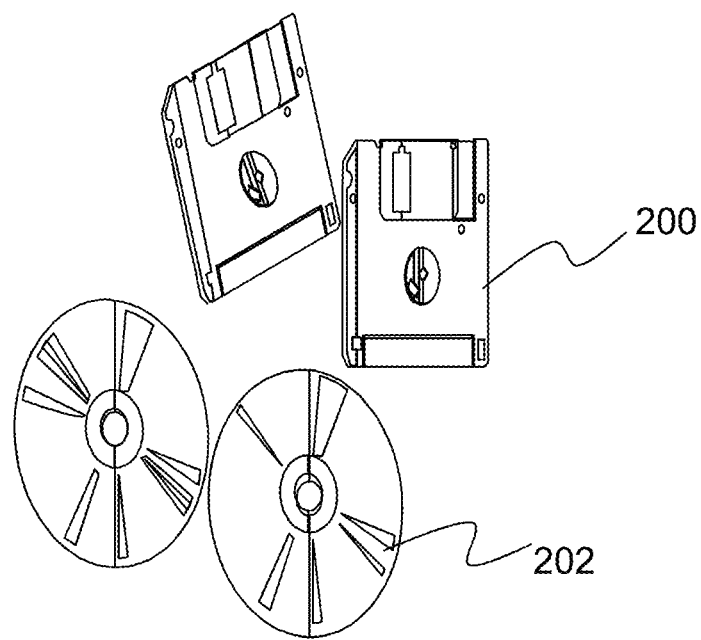
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The present disclosure provides a system and method for contrast and entropy-based perception adaption to optimize perception. The system operates by evaluating perception errors using various probes of detected objects, then correcting perception errors by solving a contrast/entropy-based optimization problem. Using the characteristics of geometry, dynamics, and detected blob image quality of the objects, the method develops the probabilistic signal temporal logic and builds axioms with the developed logic components. By evaluating these axioms, the system can verify if the detections or recognitions are valid or erroneous. Further, with the developed axioms, the system is able to develop the probabilistic signal temporal logic based constraints and solve the contrast/entropy-based optimization problem to reduce false positives and acquire more correct detections; which ultimately allows the system to achieve more accurate object recognition.

The system of the present disclosure provides a marked improvement over the prior art for several reasons, including: (1) perception error evaluation and detection using axioms generated from the perception-probe-induced probabilistic signal temporal logic; (2) perception error correction through image contrast/entropy adjustment by solving a contrast/entropy-based optimization problem under the axiom-generated constraints, and (3) detected object focused image contrast and entropy improvement for more robust object detection and recognition, rather than using the entire image's contrast ranges and entropy ranges. The system also allows for estimating and correcting perception errors with formal verification. Formally verified perception error estimation and correction by solving the corresponding optimization problems themselves is not known in the prior art. With these unique features, it is difficult for other methods to achieve similar results without following the method of the present disclosure.

(4) SPECIFIC DETAILS OF VARIOUS EMBODIMENTS

Figure 3:
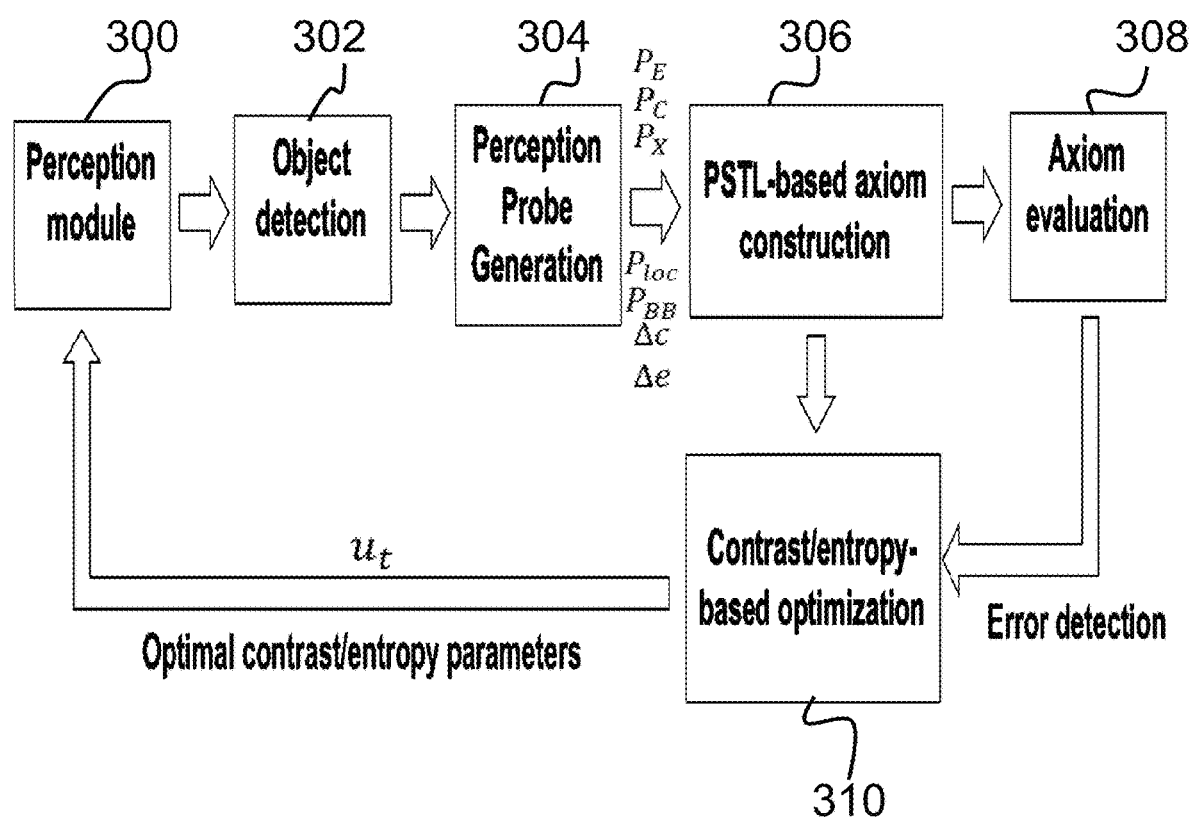
FIG. 3 is a flowchart depicting an overview of a system according to various embodiments of the present invention.

As noted above, the present disclosure is directed to a perception system and, more particularly, to a system for contrast and entropy-based perception adaption to optimize perception results. A flowchart depicting structural flow of the system is shown in FIG. 3. First, from the perception data, the system generates probes which describe characteristics of detections and recognitions, such as the size, type, tracking deviations, contrast, entropy and so on. Using the probes, probabilistic signal temporal logic (PSTL) is set up (see Literature Reference No. 4 for a discussion of PSTL). The PSTL provides axioms, each of which is constructed with a single or multiple probes with the corresponding statistical analyses. As an intermediate process, those axioms provide the error analysis on the detections/recognitions. Then, with those axiom-based constraints, an optimization problem is solved to synthesize image contrast controls for the perception modules in order to reduce perception errors and improve valid detection rates.

Referring to FIG. 3, the perception module 300 receives input images of a scene. In one aspect, the perception module 300 can be a hardware controller (such as a camera system or sensing device with or without associated software) or, in other aspects, the perception module 300 can be a preprocessing component that adjusts parameters prior to the sensing device. Object detection 302 is the performed, in which objects in the image are detected and recognized. The perception probe generation module 304 converts the perception data into probes that are used for signal temporal logic. PSTL-based axiom construction 306 is performed in which the probes are converted into the axioms under the probabilistic signal temporal logic structure. The axioms are then evaluated 308 to verify if the corresponding observations are valid or erroneous based on the constraints using the statistically analyzed probe bounds. If the axioms are invalid within certain probabilities (outside of probe bounds), an estimator module 310 estimates the optimal contrast bound and entropy bound as perception parameters to apply by solving the image contrast/entropy-based optimization problem 310. If the axioms are not invalid, then the results are delivered without any modification. Finally, the estimated parameters are delivered back to the perception module 300 to adjust its contrast and entropy. Such settings can be adjusted using any suitable technique or device. For example, contrast can be easily adjusted using tools or adjustment settings on a perception device (e.g., camera) that are commonly known to those skilled in the art. Entropy can be adjusted or modified using, for example, a filter (see FIGS. 5A and 5B and associated text). Each of these aspects are described in further detail below.

The first step in the process is to obtain the perception data along with characteristics of detections and recognitions. For clarity, the probes are the quantified version of the characteristics. To get different types of characteristics efficiently, any suitable state-of-the-art detection/recognition technique is used, a non-limiting example of which includes YOLO v3 (see Literature Reference No. 9). The following are several non-limiting examples of probes that can be used in accordance with the system of the present disclosure:

1. Object size (in the image plane and in the world coordinate frame)
2. Aspect ratio of the detected objects
3. Localization and tracking performance
4. Recognition confidence
5. Contrast of the detected boxes
6. Entropy of the detected boxes Thus, in the present system, there can be multiple probes, such as detected object sizes, aspect ratios, recognition ID consistency, tracking deviations, and so on.

Figure 4:
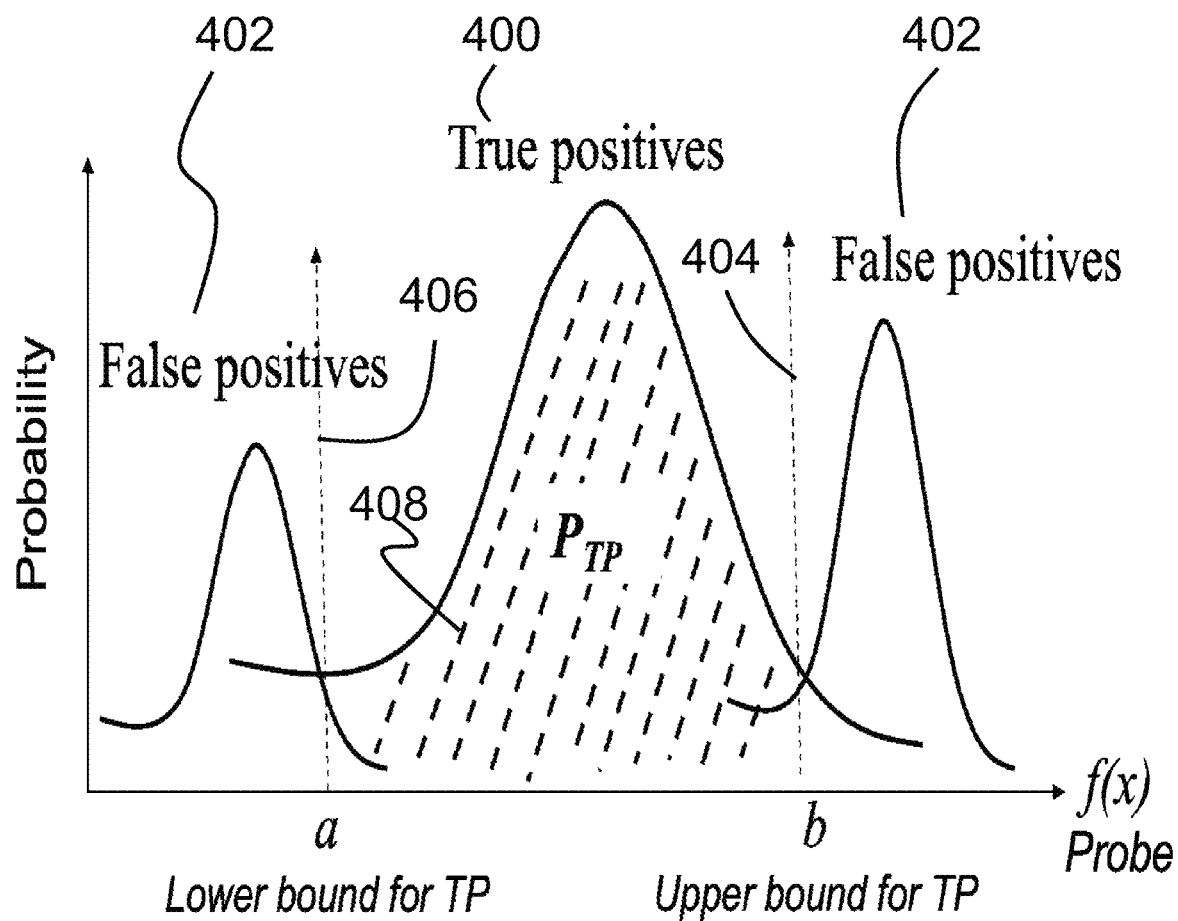
FIG. 4 is a graph depicting probability distributions of a probe according to various embodiments of the present invention.

From the true positive detections or recognitions, statistical analysis is then performed for each probe (i.e., performed in Module 308 of FIG. 3). FIG. 4, for example, provides a graph depicting true positives and false positives for a probe. For a detection/recognition, x, assume that a probe, f(x), is generated. By analyzing the values from true positives and also those from false positives, probabilistic distributions of true positives 400 and false positives 402 are obtained, as shown in FIG. 4. From the intersections between two different distribution graphs, the upper 404 and the lower 406 bounds are set for the true positives 400, with the shaded area 408 representing the confidence probability, $P_{TP}$, of the probe. If this relation is described in a mathematical form (axiom) with the probabilistic signal temporal logic, it becomes as follows:

$$\forall x, Pr(a \leq f(x, t_s : t_e) \leq b \rightarrow y) \geq P_{TP}$$

where Pr( ) is the probability, $Pr \geq P_{TP}$ is the predicate and y is the true detection or recognition, and $t_s : t_e$ means the time sequence between $t_s$ and $t_e$, so $f(x, t_s : t_e)$ is the probe sequence in the time frame of $t_s : t_e$, and a and b are the bounds. True positives and false positives are provided with training date.

Depending on the probe dimensions, the probabilistic function (e.g., probability distributions 400 and 402 in FIG. 4) can also be multi-dimensional. Examples of multi-dimensional probes include contrast, entropy, aspect, ration, etc. By integrating all the available axioms from x, a "multi-dimensional range" is obtained of the corresponding detection or recognition. When the probabilistic signal temporal logic is violated (e.g., turns false) with more than a certain threshold (e.g. the detected object size is out of the bound too frequently (as predefined or otherwise input), which means the detection bounding box is not correct) it is verified that the corresponding perception process is considered as an erroneous process. In one aspect, the threshold can be obtained experimentally and be provided as an input parameter.

Detecting perception errors is not sufficient to recover the perception quality in the following image sequences (detection does not affect any future processing). Therefore, it is also desirable to adjust perception modules to provide more accurate and robust detections and recognitions with that knowledge. To do so, the present system uses a new optimization technique using the PSTL-constraint-based optimization with the following format:

$$u_{OPT} = \arg\min_{u_t} J(x_t, u_t)$$

where $x_t$ is the probe state (i.e., probe signal) at time t and $u_t$ is the control input to the perception module, and $J(\bullet)$ is the cost function of estimating perception errors. $u_t$ can be a single number or an array of numbers, depending on the particular probe. A goal is to achieve the optimal $u_t$ to reduce perception errors. Therefore, minimizing $J(\bullet)$ can achieve the optimal perception module control input. The output of min J( ) is the input control signal to adapt the perception system to improve the next results. Eventually, the final optimization formula with the two or more PSTL-based constraints for probes, $f(x_t)$, $g(z_t)$, etc. becomes, $$u_{OPT} = \arg\min_{u_t} J(x_t, z_t, u_t)$$
$$\text{s.t. } \forall x_t, Pr(a \le f(x_t, t_s : t_e) \le b \rightarrow y) \ge P_{TPx}$$
$$\forall z_t, Pr(g(z_t, t_s : t_e) \le c \rightarrow w) \ge P_{TPz}$$
$$\vdots$$

To achieve the contrast/entropy-based perception adaptation, the object detection constraints are first set up using five different types of constraints: (1) Detection ID consistency (tracking of the same object); (2) Localization consistency within the expected trajectory; (3) Bounding box size consistency in the image plane; (4) Contrast matching in the desired range; and (5) Entropy matching in a desired range. Details for each constraint are presented below, where $t_k$ is the current time and $t_{k-M}$ is the time that the temporal logic window starts.

Consistent detection is determined as follows:

$$Pr\left(\sum_{t_k - t_{k-M}}^{t_k} \det_{ID=X}\right) > P_X$$

where $P_X$ is the probabilistic threshold for consistent ID detections. If the probability of detecting ID=X is low (which means the IDs are not consistent), the tracking results are disregarded due to lack of trust in consistency.

Localization deviation from the desired tracking trajectory is determined as follows:

$$Pr(|\text{Path}_{Desired} - loc_t|_{t=t_k - t_{k-M}}^{t_k}) < P_{loc},$$

where $loc_t$ is the detected object's location at time t and $\text{Path}_{Desired}$ is its expected path from the history. As can be appreciated, there are many techniques to computer an expected path, such as curve fitting, etc. Further, $P_{loc}$ is the probabilistic threshold for consistent localization.

Bounding box size deviation over time is determined as follows:

$$Pr(|BB_D - BB_t|_{t=t_k - t_{k-M}}^{t_k}) < P_{BB}$$

where $BB_t$ is the bounding box size (e.g., number of pixels in an image) at time t and $BB_D$ is the desired bounding box size from its history. $P_{BB}$ is the probabilistic threshold for consistent bounding box size.

Contrast is determined as follows:

$$Pr(|C_t - C_D|_{t=t_k - t_{k-M}}^{t_k}) < P_C$$

where $C_t$ is the contrast (defined using the Michelson contrast, described above) of the bounding box at time t and $C_D$ is the desired contrast from the training phase. The training phase is the statistical analysis to determine all the constant values (thresholds). $P_C$ is the probabilistic threshold for contrast.

Entropy is determined as follows:

$$Pr(|E_t - E_D|_{t=t_k - t_{k-M}}^{t_k}) < P_E$$

where $E_t$ is the image entropy (see Literature Reference No. 12) of the bounding box at time t and $E_D$ is the desired entropy from the training phase. $P_E$ is the probabilistic threshold for entropy.

The corresponding optimization formula to control contrast ($c_i(t) + \Delta c$) and entropy ($e_i(t) + \Delta e$) with the cost function $J(e, c, \Delta e, \Delta c)$ is, $$\arg\min_{\Delta c, \Delta e} J(e, c, \Delta e, \Delta c) =$$
$$\arg\min_{\Delta c, \Delta e} \sum_{i=1}^{n} (|e_i(t) - e_D - \Delta e| + |c_i(t) - c_D - \Delta c|)$$

where $c_i(t)$ is the contrast value and $e_i(t)$ is the entropy value of the $i^{th}$ detected object at time t (e.g., with $C_t$ and $c_i(t)$ being the same in desired aspects). $c_D$ is the desired contrast value and $e_D$ is the desired entropy value from the procedure of finding the probabilistic distributions of the probes (e.g., being the same as $C_D$ and $E_D$, respectively). $\Delta c$ and $\Delta e$ are the system control inputs for contrast and entropy, respectively (which are the same as estimated deviations to apply to the perception module (i.e., camera system)).

For contrast control, once the desirable contrast deviation (i.e., the desired contrast value $c_D$) is acquired, the expansion of histogram ranges are set up (e.g., using commonly known histogram equalization techniques) to achieve the contrast changes using the peak-to-peak contrast (Michelson contrast) (see Literature Reference No. 10). The peak-to-peak contrast (as applied to the corresponding bounding box) is defined in the following way:

$$C(t) = \frac{I_{max} - I_{min}}{I_{max} + I_{min}}$$

where $I_{max}$ is the maximum image intensity value and $I_{min}$ is the minimum image intensity value. From this definition, one can expect a new contrast will be:

$$C_{desired} = \frac{I_{max} - I_{min} + 2B}{I_{max} + I_{min}}$$

Where B is the expanded histogram range (in both direction) to achieve the new contrast. Since $\Delta c = C_{desired} - C(k)$, the histogram change range changing amount will be:

$$B = \frac{\Delta c \cdot (I_{max} + I_{min})}{2}.$$

Note that C(k) is the kth bounding box contrast. Therefore, the deviation is the desired one minus the current one.

Figure 5A:
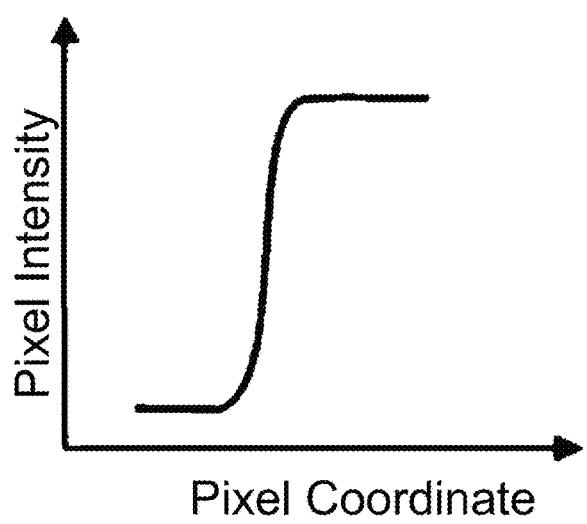
FIG. 5A is a graph depicting adjusting entropy using a sharpening filter.
Figure 5B:
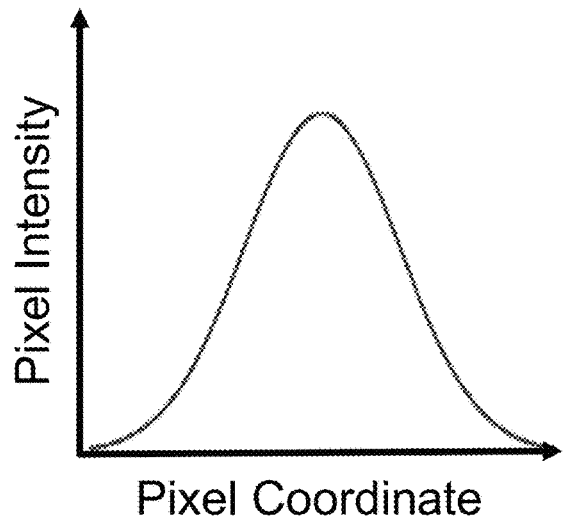
FIG. 5B is a graph depicting adjusting entropy using a smoothing filter.

For entropy, "image kernels" are applied depending on $\Delta e$. After optimization, the value is estimated. If $\Delta e$ is positive, a sharpening filter is applied to increase entropy (as shown in FIG. 5A). On the other hand, if $\Delta e$ is negative, a smoothing filter is applied to decrease entropy (as shown in FIG. 5B). Each filter's derivative level is proportional to the amount of $\Delta e$, and the corresponding proportional relationship is obtained from multiple and uniformly distributed sample detections.

The outputs using the process described herein are adjusted perception (sensor) module (e.g. cameras) parameters. For example, different camera contrast values can be changed since the contrast in the camera system is changed through the system. The detection results from the image processing will also be changed. The system of the present disclosure shows how such parameters can be changed more appropriately. The optimized sensor parameters actually improve the object detection results. As can be appreciated by those skilled in the art, such an adaptive sensor system can be implemented in a variety of application, such as for autonomous vehicles or unmanned aircraft systems.

Figure 6:
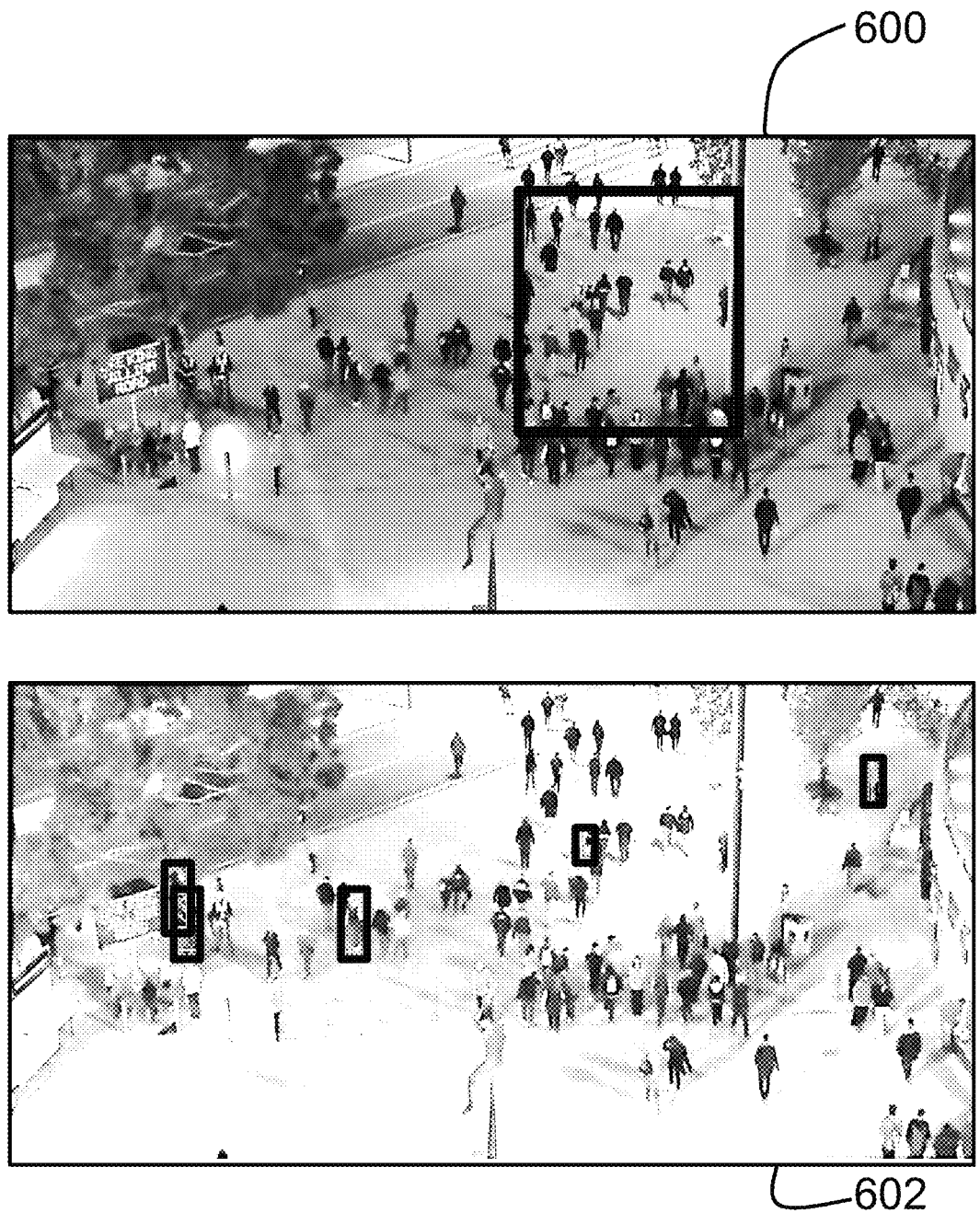
FIG. 6 is an illustration depicting samples of error reduction and detection improvement.
Figure 7A:
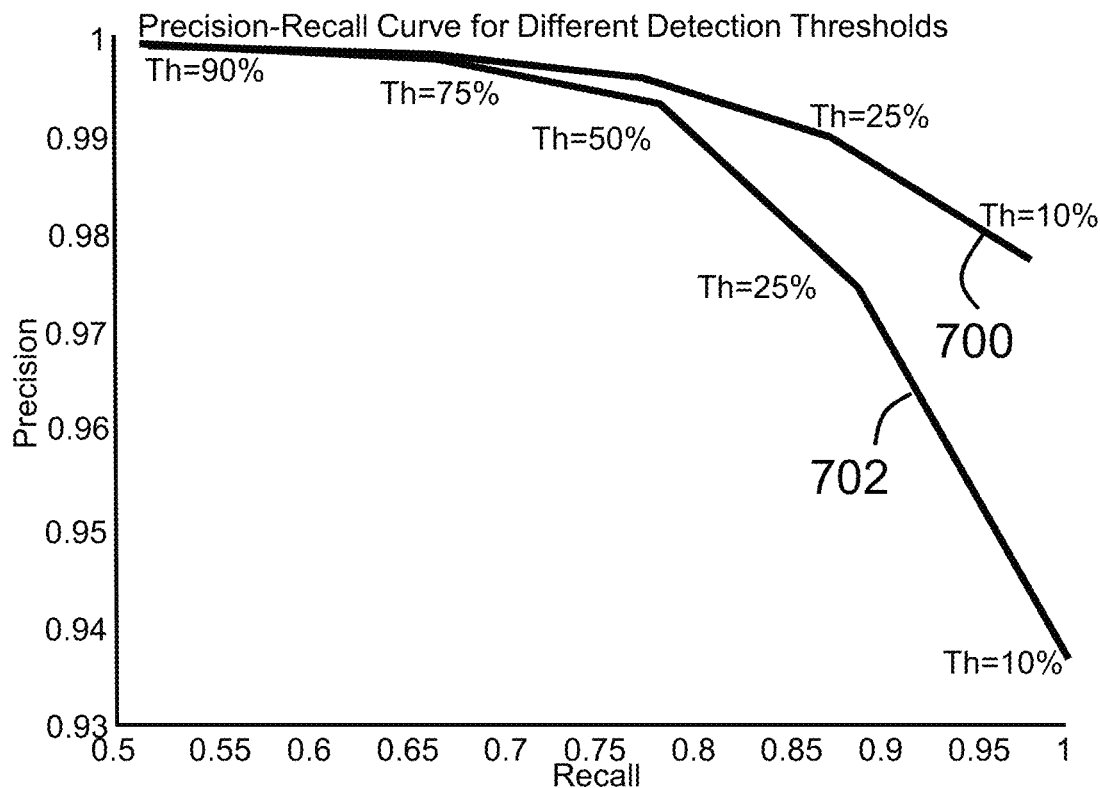
FIG. 7A is a precision-recall curve for different detection thresholds.
Figure 7B:
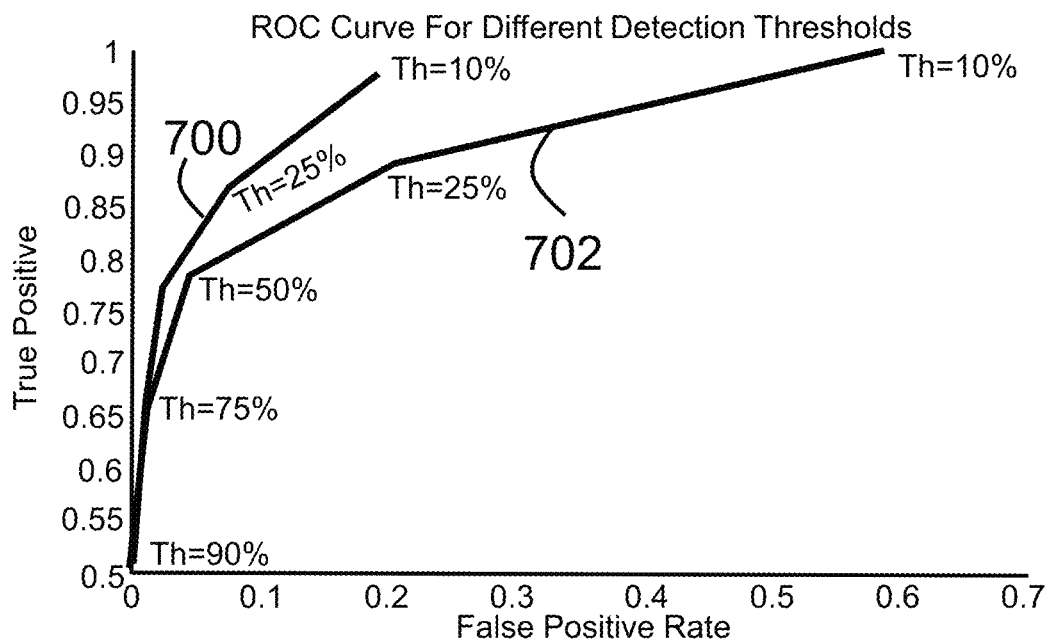
FIG. 7B is a receiver operating characteristics (ROC) curve for different detection thresholds.

In order to demonstrate the efficacy of the present system, a simple test result is provided for one of the Multiple Object Tracking Benchmark datasets (as described in Literature Reference No. 11). As shown in FIG. 6, the contrast-based optimization method of the present disclosure improved the detection results. FIG. 6 shows a pair of the sample input image and the corresponding perception adapted image. The box in the upper image 600 is a wrong person detection from the original image using a perception system of the prior art, while the boxes in the lower image 602 are correct person detections (e.g., each box containing a single person) that were provided using the present method. For further support with quantified performances, FIG. 7A provides a precision-recall graph, while FIG. 7B provides a receiver operating characteristics (ROC) graph. As shown in the graphs, the adjusted approach 700 of the present invention outperforms that of the prior art 702, presenting better recall rates with the same precision, and also less false positive rates with achieving the same true positive rates. It is noted that in the ROC curve of FIG. 7B, with 10% detection confidence thresholding, the false positive rate of the present invention is reduced by 41.48% relative to the prior art. Thus, it is clear that the method and system of the present disclosure provides a marked improvement over perception systems of the prior art.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for contrast and entropy-based perception adaption to optimize perception, the system comprising:
one or more processors and a memory, the memory being a non-transitory computer-readable medium having executable instructions encoded thereon, such that upon execution of the instructions, the one or more processors perform operations of:
receiving an input image of a scene with a camera system;
detecting one or more objects in the input image, the one or more objects having perception data;
converting the perception data of the one or more objects into probes;
converting the probes into axioms using probabilistic signal temporal logic;
evaluating the axioms based on probe bounds, such that if the axioms are outside of the probe bounds, estimating optimal contrast bounds and entropy bounds as perception parameters; and
adjusting contrast and entropy in the camera system based on the perception parameters.

2. The system as set forth in claim 1, wherein in adjusting entropy, image kernels are applied such that if a change in entropy is positive, a sharpening filter is applied to increase entropy, and if a change in entropy is negative, a smoothing filter is applied to decrease entropy.

3. The system as set forth in claim 1, wherein adjusting contrast includes acquiring a desirable contrast deviation, such that once a desirable contrast deviation is acquired, histogram ranges are set to achieve contrast changes using a peak-to-peak contrast.

4. The system as set forth in claim 1, wherein the camera system is incorporated into an adaptive sensor system of an autonomous vehicle or an unmanned aircraft system.

5. A computer program product for contrast and entropy-based perception adaption to optimize perception, the computer program product comprising:
a non-transitory computer-readable medium having executable instructions encoded thereon, such that upon execution of the instructions by one or more processors, the one or more processors perform operations of:
receiving an input image of a scene with a camera system;
detecting one or more objects in the input image, the one or more objects having perception data;

converting the perception data of the one or more objects into probes;

converting the probes into axioms using probabilistic signal temporal logic;

evaluating the axioms based on probe bounds, such that if the axioms are outside of the probe bounds, estimating optimal contrast bounds and entropy bounds as perception parameters; and adjusting contrast and entropy in the camera system based on the perception parameters.

6. The computer program product as set forth in claim 5, wherein in adjusting entropy, image kernels are applied such that if a change in entropy is positive, a sharpening filter is applied to increase entropy, and if a change in entropy is negative, a smoothing filter is applied to decrease entropy.

7. The computer program product as set forth in claim 5, wherein adjusting contrast includes acquiring a desirable contrast deviation, such that once a desirable contrast deviation is acquired, histogram ranges are set to achieve contrast changes using a peak-to-peak contrast.

8. The computer program product as set forth in claim 5, wherein the camera system is incorporated into an adaptive sensor system of an autonomous vehicle or an unmanned aircraft system.

9. A computer implemented method for contrast and entropy-based perception adaption to optimize perception, the method comprising an act of:

causing one or more processors to execute instructions encoded on a non-transitory computer-readable medium, such that upon execution, the one or more processors perform operations of:

receiving an input image of a scene with a camera system;

detecting one or more objects in the input image, the one or more objects having perception data;

converting the perception data of the one or more objects into probes;

converting the probes into axioms using probabilistic signal temporal logic;

evaluating the axioms based on probe bounds, such that if the axioms are outside of the probe bounds, estimating optimal contrast bounds and entropy bounds as perception parameters; and adjusting contrast and entropy in the camera system based on the perception parameters.

10. The method as set forth in claim 9, wherein in adjusting entropy, image kernels are applied such that if a change in entropy is positive, a sharpening filter is applied to increase entropy, and if a change in entropy is negative, a smoothing filter is applied to decrease entropy.

11. The method as set forth in claim 9, wherein adjusting contrast includes acquiring a desirable contrast deviation, such that once a desirable contrast deviation is acquired, histogram ranges are set to achieve contrast changes using a peak-to-peak contrast.

12. The method as set forth in claim 9, wherein the camera system is incorporated into an adaptive sensor system of an autonomous vehicle or an unmanned aircraft system.

\* \* \* \* \*